US012222628B2

(12) United States Patent
Xu et al.

(10) Patent No.: US 12,222,628 B2
(45) Date of Patent: Feb. 11, 2025

(54) NONLINEAR OPTICAL DEVICE

(71) Applicant: HUAZHONG UNIVERSITY OF SCIENCE AND TECHNOLOGY, Hubei (CN)

(72) Inventors: Jing Xu, Hubei (CN); Hanghang Li, Hubei (CN); Xinliang Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 168 days.

(21) Appl. No.: 18/312,593

(22) Filed: May 5, 2023

(65) Prior Publication Data

US 2024/0369903 A1 Nov. 7, 2024

(51) Int. Cl.
*G02F 1/35* (2006.01)
(52) U.S. Cl.
CPC .......... *G02F 1/3503* (2021.01); *G02F 1/3509* (2021.01)
(58) Field of Classification Search
CPC ................................................ G02F 1/35–397
See application file for complete search history.

(56) References Cited

U.S. PATENT DOCUMENTS 8,606,055 B2 * 12/2013 Lipson .................... G02F 1/025
385/39
2024/0369903 A1 * 11/2024 Xu .......................... G02F 1/353

FOREIGN PATENT DOCUMENTS

CN 115268162 11/2022

* cited by examiner

*Primary Examiner* — Rhonda S Peace
(74) *Attorney, Agent, or Firm* — JCIPRNET (57) ABSTRACT

A nonlinear optical device includes two coupling systems. A coupling coefficient between the two coupling systems is regulated and controlled. During operation, the pump light input from a straight waveguide is coupled into the second coupling system through the first coupling system and obtains great resonance enhancement in the second coupling system, so it is ensured that the second coupling system is in a high energy state. For signal light input from the same end of the straight waveguide, the signal light enters a resonator of the second coupling system through the coupling between the first and second coupling systems. A nonlinear effect of the system mainly occurs in the resonator of the second coupling system because in the resonator of the second coupling system, the pump light is in a great resonance enhancement. The entire resonator is in a high energy state.

7 Claims, 7 Drawing Sheets

A perimeter of a large-sized microring resonator in a second coupling system is an integer multiple of a perimeter of a small-sized microring resonator in a first coupling system, and losses of all the microring resonators are as small as possible.

For signal light, the first coupling system of the system provides a device bandwidth larger than an expected bandwidth of the signal light to prevent signal distortion.

For pump light, a significant resonance enhancement is achieved in the resonator of the second coupling system through the coupling between the two parts.

The coupling between the first coupling system and the second coupling system produces a slight frequency split, and resonance peak-widened signal light enters the microring of the second coupling system without distortion.

NONLINEAR OPTICAL DEVICE

BACKGROUND

Technical Field

The disclosure belongs to the field of optical devices, and in particular, relates to a nonlinear optical device.

Description of Related Art

Since humans entered the information age, the demands for higher communication speed and capacity have grown exponentially. Optical fibers have been widely used in communication backbone networks due to their advantages such as low costs, low losses, and large capacities. In recent years, with the introduction and implementation of concepts such as the Internet of Things and cloud services, higher demands are placed on communication speed and capacity. In order to satisfy the increasing communication transmission speed, wavelength division multiplexing (WDM), optical time division multiplexing (OTDM) and mode division multiplexing (MDM) technologies have been proposed one after another, and the speed and capacity of fiber optic communication systems have been greatly improved. The current communication system based on digital electronic switching technology has approached the processing limit of electronic devices, and the communication bottleneck brought by optical-electrical-optical technology seriously restricts the development of communication system. In the all-optical communication network, data transmission, exchange, and processing are all carried out in the optical domain, and the electronic bottleneck caused by the optical-electrical-optical mode is avoided, so it has attracted increasing attention. On the other hand, due to the development and maturity of semiconductor processing technology, integrated optical devices exhibit the characteristics of small size, low costs, wide bandwidth, and good stability, and optoelectronic technology is developing in the direction of optoelectronic integration. The combination of micro-nano optical waveguides and nonlinear optics commonly used in optoelectronic integration has shown unique advantages in the all-optical communication network. By utilizing the optical nonlinear effect in the micro-nano waveguides, functions such as signal amplification and wavelength conversion can be implemented.

In 2003, R. Claps et al. first confirmed in experiments that the stimulated Raman scattering phenomenon in silicon waveguides can be used to achieve optical amplification and lasers. In 2005, R. Jones achieved continuous optical Raman amplification with a gain of 3 dB.

In 2005, H. Fukuda et al. confirmed that high-speed all-optical wavelength conversion can be achieved in silicon waveguides by using the four-wave mixing (WM) process, and the wavelength conversion efficiency can be improved by designing ring resonators. Subsequently, in order to improve the efficiency, Yamada et al. used a silicon waveguide with a pattern-spot converter for wavelength conversion, and the conversion efficiency was increased to −10.6 dB. Although the all-optical wavelength converter with a SOI silicon-based waveguide structure has a simple structure, it usually requires a large pump power and a long length, making the device on the order of millimeters. This is not conducive to the integration of devices, nor does it meet the demands for low power consumption.

Figure 1:
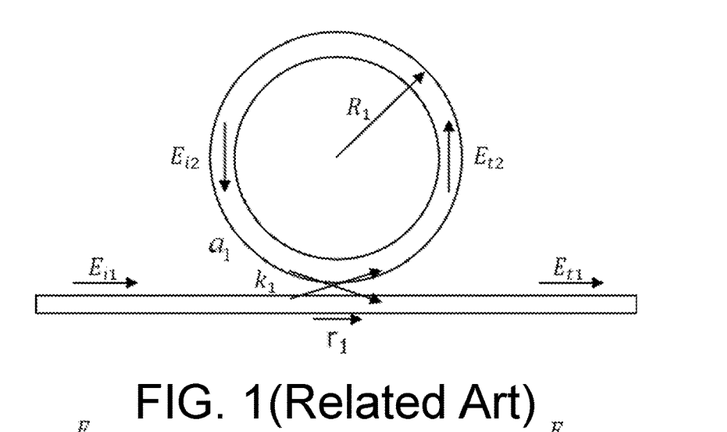
FIG. 1 is a schematic structural diagram of a single microring resonator coupled to a waveguide according to the related art.

In 2007, P. Del'Hayel et al. used the resonance enhancement effect in a microring with a Q value as high as 108 to achieve optical parametric oscillation. Later, the Lipson achieved high efficiency parametric oscillation with mW pump power using a high Q microring. Alessia Pasquazi et al. using the FWM in the microring as shown in FIG. 1 effectively achieved 2.5 Gbit/s wavelength conversion.

Figure 2:
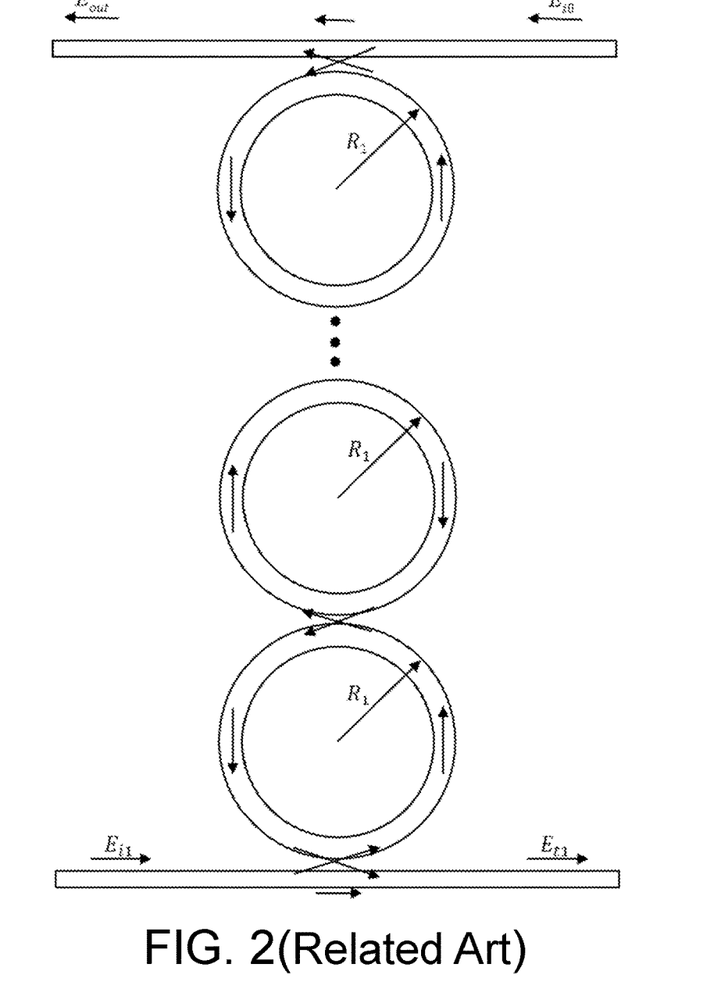
FIG. 2 is a structural schematic diagram of a plurality of microring resonators coupled in series according to the related art.

In 2015, F. Morichett et al. used a coupled resonator optical waveguide (CROW), as shown in FIG. 2, to achieve wavelength conversion with a 16 dB increase in efficiency compared to a single microring under the conditions of 80 GHz bandwidth and 12 dBm pump injection. However, this structure is very sensitive to the coupling coefficient between two adjacent rings, so eight heaters are introduced to control the coupling coefficient, but the complexity of the system is increased.

Figure 3:
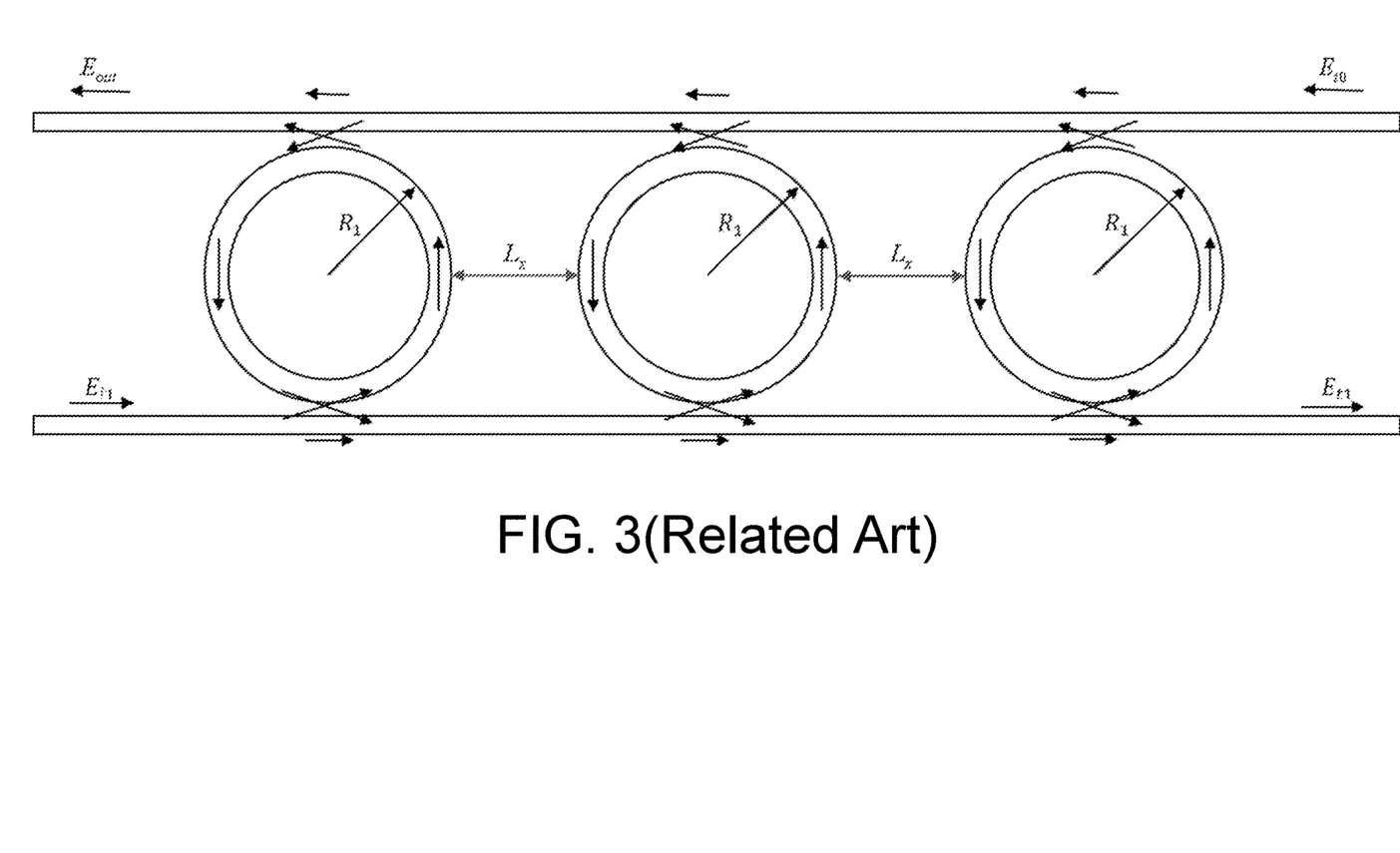
FIG. 3 is a structural schematic diagram of three microring resonators coupled in parallel according to the related art.
Figure 4:
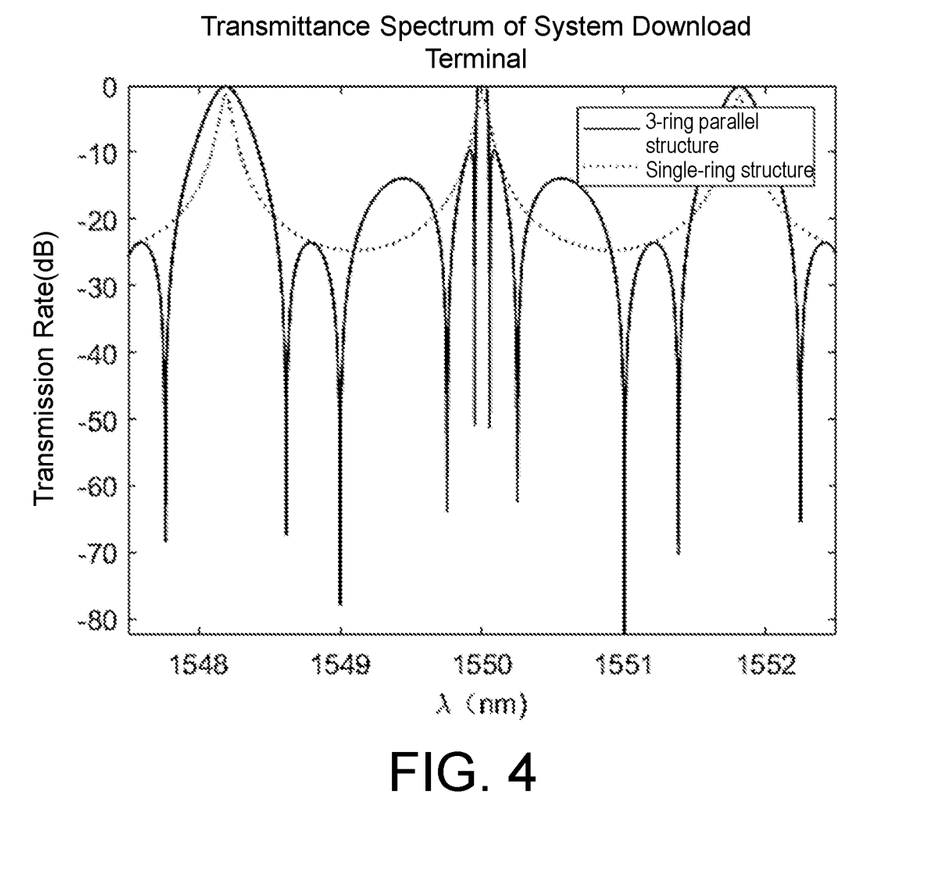
FIG. 4 is a schematic chart comparing a transmittance spectrum of the structure of three microring resonators coupled in parallel to a transmittance spectrum of the structure of a single microring resonator coupled to a waveguide.

In 2018, M. Zhang et al. used a parallel microring resonator structure as shown in FIG. 3 to achieve wavelength conversion with a 15 dB higher efficiency than a single ring structure under the conditions of 25 GHz bandwidth and 10 dBm pump injection. This structure can achieve the transmission characteristics that wide and narrow bandwidths appear alternately, as shown in FIG. 4. A resonance with a narrow bandwidth can be utilized to enhance the pump, and the signal can be processed in a resonance with a wide bandwidth. In this way, the wavelength conversion efficiency can be improved while a wide signal bandwidth is ensured. However, since the structure is achieved by the parallel connection of three microrings, there is no coupling among the microrings, and the intensity of the nonlinear effect in the microrings has not been greatly improved.

Regarding the Related Art:
1. When silicon-based optical waveguides are used to achieve the nonlinear effect, the bandwidth depends on the material, and there is no other limitation, but a large device size and input power are required. Therefore, the efficiency is low, and it is not conducive to integration.
2. The use of a resonator to achieve the nonlinear effect makes good use of the resonance enhancement effect of the resonator, reduces the required input power, and improves the occurrence efficiency of the nonlinear effect. In order to significantly improve the occurrence efficiency of the nonlinear effect, it is necessary to use a resonator with a high Q. However, severe bandwidth limitations are present in high-Q resonators, making them less practical.
3. In the case of using cascaded-coupled micro-ring resonators to achieve the nonlinear effect, the bandwidth of the device is greatly expanded while the efficiency of the nonlinear effect is ensured. However, regarding the structure with plural resonators connected in series, the sensitivity to the parameters is excessively high, so there are high requirements on the processing technology, and in addition, the thermal stability is poor.
4. The use the parallel structure of resonators to achieve the nonlinear effect can achieve the large bandwidth of the device. However, the occurrence efficiency of the nonlinear effect of the system is not excessively high, and an obvious bandwidth upper limit is not provided.

SUMMARY

In view of the defects found in the related art, the disclosure provides a nonlinear optical device and aims to solve the restriction problem between nonlinear efficiency and a device bandwidth found in the related art when a resonator is treated as a nonlinear effect generating device.

To achieve the above, the disclosure provides a nonlinear optical device including a first coupling system and a second coupling system.

The first coupling system includes a straight waveguide and at least one first microring resonator.

The second coupling system includes a second microring resonator. A perimeter of the second microring resonator is N times a perimeter of the at least one first microring resonator, N is an integer, and N is greater than 1.

An optical signal transmitted by the straight waveguide is coupled to a first microring resonator in the at least one first microring resonator. When the at least one first microring resonator includes two or more than two first microring resonators, each of the first microring resonators is only coupled to the optical signal transmitted by the previous first microring resonator. The coupling is that an optical signal transmitted by a previous component is coupled and transmitted to a next component.

An optical signal transmitted by a last first microring resonator is coupled to the second microring resonator and is outputted after being transmitted by the second microring resonator, and the optical signal includes pump light and signal light.

Parameters of the first coupling system and the second coupling system are controlled, so that the optical device is in an over-coupling state close to a critical coupling state. The critical coupling state is that the pump light is not emitted from the other end of the straight waveguide after being incident on one end of the straight waveguide, and all remains in the at least one first microring resonator and the second microring resonator. When the optical device is in the critical coupling state, the second coupling system introduces a $\pi$ phase shift to the first coupling system at its own resonant frequency. The pump light resonates weakly in the first resonant system and is resonantly enhanced by the second coupling system.

The number of the at least one first microring resonator and the degree of over-coupling of the optical device are controlled, so that a bandwidth of the first coupling system is greater than a bandwidth of the incident signal light, and the signal light is prevented from being distorted in the first coupling system. The perimeter of the second microring resonator is N times the perimeter of the at least one first microring resonator, so that the first coupling system and the second coupling system have several same resonant frequencies. The optical device is in the over-coupling state close to critical coupling state at the same resonant frequency. The signal light generates a slight frequency split at a resonant peak of the second coupling system, so that a full width at half maximum of the resonant peak of the second coupling system is widened, and the signal light enters the second coupling system without distortion. The pump light and the signal light give rise to a nonlinear effect in the second coupling system.

In an optional embodiment, a bandwidth of the resonant peak corresponding to a central wavelength of the signal light in the second coupling system is greater than a bandwidth of a resonant peak corresponding to a central wavelength of the pump light in the second coupling system.

In an optional embodiment, a material of the at least one first microring resonator and a material of the second microring resonator are the same.

In an optional embodiment, a loss of the at least one first microring resonator and a loss of the second microring resonator are both below 5 dB/cm.

In an optional embodiment, both the pump light and the signal light obtain relatively high resonance enhancement in the second coupling system, so that the second coupling system is in a relatively high energy state, and that intensity and occurrence efficiency of the nonlinear effect in the second coupling system are relatively improved.

In an optional embodiment, the perimeter of the second microring resonator is N times the perimeter of the at least one first microring resonator, so that a free spectral range of the at least one first microring resonator is N times a free spectral range of the second microring resonator, a series of resonant frequencies of the at least one first microring resonator are also resonant frequencies of the second microring resonator, and after the first coupling system and the second coupling system are coupled, splitting of the resonance peak occurs at the same resonance frequency, so that the bandwidth of the resonance peak at the same resonance frequency increases.

Since the perimeter of the second microring resonator is N times the perimeter of the at least one first microring resonator, for the second microring resonator, N−1 resonant frequencies are presented between two resonant frequencies of the at least one first microring resonator. After the first coupling system and the second coupling system are coupled, N−1 small peaks are generated between the two resonance frequencies of the at least one first microring resonator. The second microring resonator further provides a resonance enhancement effect, and a high resonance enhancement effect is achieved at the resonance frequencies corresponding to these N−1 small peaks.

To sum up, the above technical solutions provided by the disclosure exhibit the following beneficial effects compared to the related art.

The disclosure provides a nonlinear optical device. In the disclosure, due to the use of the micro-ring resonators, the nonlinear effect efficiency is increased many times compared to the straight waveguide due to the resonance enhancement effect of the resonators. The size of the required waveguide is greatly reduced, which significantly facilitates the integration requirements. In contrast to single microring systems, a plurality of microrings are used in the disclosure. Further, by setting the multiplier relationship between the perimeters of the microring resonators, significant resonance enhancement of the pump light and the relatively high resonance enhancement of the high-speed and large-bandwidth signal light can be achieved together. Under the condition of the same bandwidth, in the disclosure, the nonlinear efficiency is several orders of magnitude higher than that of a single-ring system. In the disclosure, a high degree of flexibility is also provided, which can be flexibly selected according to the requirements of practical applications. In the disclosure, the tolerance to system parameter errors is better, and compared to the structural system with CROW, the requirements on process precision are greatly reduced, and good thermal stability is provided. Besides, compared to the structural system with multiple microrings connected in parallel, in the disclosure, the resonance enhancement of the pump light and the regulation and control of the bandwidth of the signal light are separated more thoroughly. On the premise of ensuring the same conversion efficiency, the disclosure provides a higher bandwidth upper limit than a structural system with multiple microrings connected in parallel.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure.

Regarding the defects found in the related art, the disclosure provides a method for designing a high-speed and low-power nonlinear device and aims to solve the restriction problem between nonlinear efficiency and a device bandwidth found in the related art when a resonator is treated as a nonlinear effect generating device.

The disclosure provides a method for designing a high-speed and low-power nonlinear device, and the method is implemented based on microring resonator coupling. The whole system can be divided into two parts. A first coupling system includes a straight waveguide and a plurality of microring resonators with a same small size, and a second coupling system only includes one microring resonator with a larger size. The structure of a nonlinear optical device designed by this method is as follows:

The first coupling system utilizes the coupling between the straight waveguide and the microrings and the coupling between several microrings to provide the system with a device bandwidth that allows a signal to pass through without distortion. Through the coupling between the first coupling system and the second coupling system, signal light in the first coupling system is coupled into the large-sized microring resonator of the second coupling system, and a certain resonance enhancement is obtained therein. At the same time, by utilizing the coupling between the first coupling system and the second coupling system, pump light can obtain maximum resonance enhancement in the microring resonator of the second coupling system.

The pumping light is input from the straight waveguide so that the resonance is greatly enhanced in the resonator of the second coupling system, and the resonance enhancement effect of more than 10 dB is obtained, so that the resonator is in a high energy state.

The signal light is input from the same end of the straight waveguide so that the resonance is enhanced in the resonator of the second coupling system, while the signal is ensured not to be distorted.

The signal light and the pump light give rise to a nonlinear effect mainly in the large-sized resonator of the second coupling system. Since the resonator of the second coupling system is in a high energy state, the intensity of the nonlinear effect occurring therein is to be increased by at least 10 dB. The specific increased value depends on the designed device, and occurrence efficiency of the nonlinear effect may also be improved to the same extent.

Further, a bandwidth of the first coupling system is configured to be slightly greater than a signal bandwidth, so that the signal light input from the straight waveguide is coupled into the large-sized resonator in the second coupling system where the nonlinear effect occurs without distortion.

Furthermore, all resonators are made of the same material. The lower the loss of all resonators, the better, so the loss of the material used in the resonators is below 5 dB/cm.

Further, a perimeter of the resonator of the second coupling system is an integer multiple of a perimeter of each of the small-sized resonators of the first coupling system.

Further, a bandwidth of a resonant peak corresponding to a central wavelength of the signal light in the second coupling system is greater than a bandwidth of a resonant peak corresponding to a central wavelength of the pump light in the second coupling system.

In the disclosure, under the condition of presence of a large device bandwidth in the existing resonator, the problem of low nonlinear conversion efficiency is overcome, and a method suitable for ultra-high nonlinear effect efficiency for a high-speed wide-bandwidth signal is provided, and a broader idea is provided for using the resonator as a nonlinear effect generating device.

In the disclosure, for the nonlinear response of the system, the regulation and control of inputting the pump light and the signal light are separated, and the separation of the bandwidth separation and resonance enhancement effect is achieved. The disclosure is applicable to all non-linear problems with product contradiction between bandwidth and conversion efficiency.

To be specific, the disclosure provides a method for improving nonlinear efficiency by utilizing the coupling between the straight waveguide and the microrings and the coupling between the microrings. In the method, bandwidth separation and nonlinear intensity separation are achieved for the signal light and pump light input from the same port of the straight waveguide through the coupling between the waveguide and the rings and the coupling between the rings.

The nonlinear optical device provided by the disclosure needs to meet the following conditions: (1) For the pump light, the resonance enhancement in the resonator of the second coupling system is to be as large as possible; (2) For the signal light, the largest possible resonance enhancement is provided under the condition that the bandwidth is ensured.

In the disclosure, abovementioned requirements are satisfied by following design: (1) The perimeter of the large-sized microring resonator in the second coupling system is N times the perimeter of each of the small-sized microring resonators in the first coupling system. N is an integer greater than 1, and the losses of all microring resonators is to be as small as possible. A free spectral range of the microrings in the first coupling system is N times a free spectral range of the microring in the second coupling system. A series of resonant frequencies of the microrings in the first coupling system are also resonant frequencies of the microring in the second resonant system. After the two systems are coupled, splitting of the resonant peaks occur at these resonant frequencies, so that the bandwidth of the resonant peaks at these frequencies increases. The size of the microring in the second coupling system is N times the size of each of the microrings in the first coupling system. Therefore, for the microring of the second coupling system, there are still N−1 resonance frequencies between the two resonance frequencies of the microrings of the first coupling system. After the two are coupled, N−1 small peaks are to be generated between the two resonance frequencies of the microrings in the first coupling system. The microring in the second coupling system further provides a resonance enhancement effect, and a high resonance enhancement effect can be achieved at these resonance frequencies. (2) For the pump light, the maximum resonance enhancement is achieved in the resonator of the second coupling system by the coupling between the two parts. (3) For the signal light, the first coupling system of the system provides a device bandwidth larger than the expected bandwidth of signal light to prevent signal distortion. (4) The coupling between the first coupling system and the second coupling system generates a frequency split, and the signal light enters the microring of the second coupling system without distortion.

Figure 5:
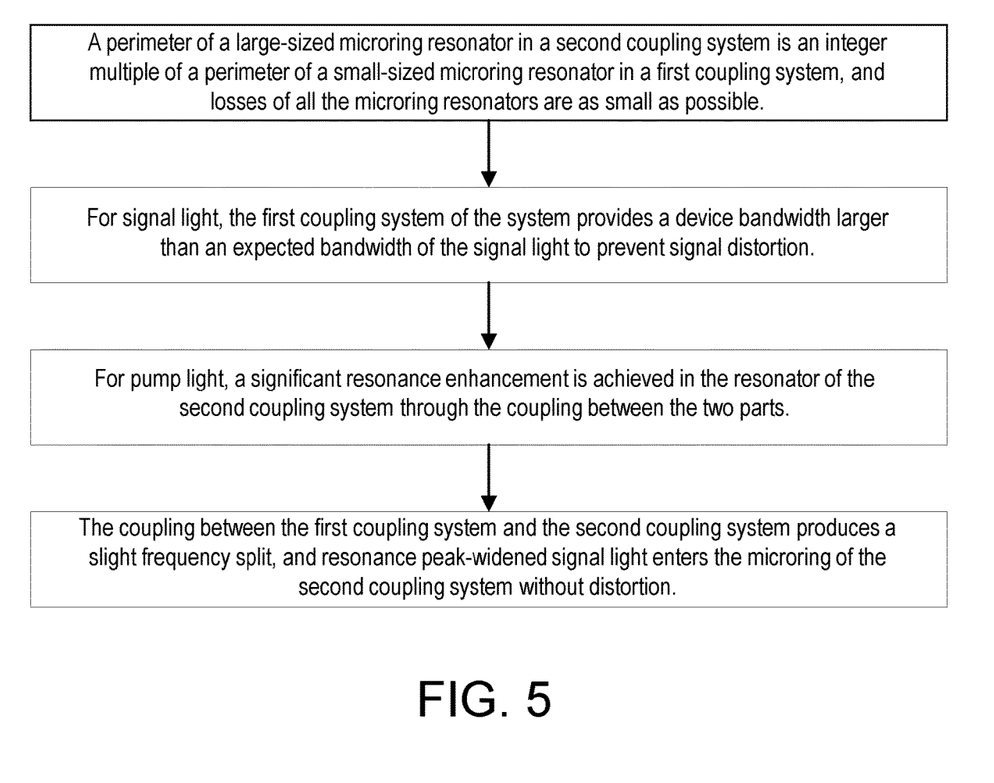
FIG. 5 is a flow chart of implementation of a method for increasing intensity of a nonlinear effect in a resonator according to an embodiment of the disclosure.

As shown in FIG. 5, the disclosure provides a method for increasing the intensity of the nonlinear effect in a large-device bandwidth resonator. The method includes the following steps:

(1) Through the coupling between the straight waveguide and the rings and the coupling between the rings in the first coupling system, a bandwidth capable of passing through a broadband signal to be processed is obtained. Through the coupling between the first coupling system and the second coupling system, the signal light is coupled into the resonator of the second coupling system, and certain resonance enhancement is obtained. At the same time, the pump light is also coupled into the resonator of the second coupling system from the first coupling system, and the maximum resonance enhancement is obtained.

(2) The pump light is greatly increased in the resonator of the second coupling system, and the whole resonator is in a high energy state.

(3) The signal light enters the device through the straight waveguide, and a certain resonance enhancement is obtained in the second coupling system. At the same time, the large device bandwidth ensures that the signal is not to be distorted.

(4) The signal light and the pump light give rise to the nonlinear effect mainly in the second coupling system. According to the above, since the second coupling system is in a high energy state, the intensity of the nonlinear effect in the resonator is greatly improved, and the occurrence efficiency of the nonlinear effect may also be similarly improved.

In the embodiments of the disclosure, the materials of all the resonators are the same, and the perimeter of the microring in the second coupling system is an integer multiple of the perimeter of each of the microrings in the first coupling system. The first coupling system and the second coupling system are coupled, so that the signal light can be coupled into the second coupling system, and a certain resonance enhancement can be obtained therein.

Further, the bandwidth of the second coupling system is expanded by using frequency splitting generated by the coupling of the two coupling systems, so that the signal light is not distorted in the second coupling system.

The coupling coefficient between the two coupling systems is regulated and controlled, so that the pump light achieves maximum resonance enhancement in the second coupling system. During operation, the pump light input from the straight waveguide is coupled into the second coupling system through the first coupling system and obtains great resonance enhancement in the second coupling system, so it is ensured that the second coupling system is in a high energy state. For the signal light input from the same end of the straight waveguide, it enters the resonator of the second coupling system through the coupling between the first and second coupling systems and obtains resonance enhancement therein. The nonlinear effect of the whole system mainly occurs in the resonator of the second coupling system because in the resonator of the second coupling system, the pump light is in a great resonance enhancement. The entire resonator is in a high energy state, the intensity of the nonlinear effect occurring in it is to be greatly improved, and the occurrence efficiency of the nonlinear effect is to be greatly improved as well.

In the disclosure, for the pump light, it is only necessary to ensure its maximum resonance enhancement in the second coupling system, without considering the bandwidth of the frequency band where the pump light is located. In this way, the resonance enhancement effect of the resonator is utilized to the greatest extent, and the pump power threshold required when the nonlinear effect occurs in the entire system is greatly reduced.

In the disclosure, for signal light, the first coupling system provides a device bandwidth greater than the expected bandwidth of signal light. Further, the coupling between the first and second coupling systems provides a slight mode splitting. The signal light can enter the resonator of the second coupling system without distortion, and the nonlinear effect of the device suitable for a high-speed and large-bandwidth signal is ensured.

In the disclosure, the resonators in the first coupling system may be flexibly increased or decreased according to the requirements of practical applications.

In the structure provided by the disclosure, the perimeter of the microring in the second coupling system is an integer multiple of the perimeter of each of the microrings in the first coupling system, and wavelength of the pump light meets the requirement of resonating in the second coupling system and not resonating in the resonator of the first coupling system. The wavelength of the signal light satisfies resonance in both the microrings of the first and second coupling systems. Therefore, in the actual application of the disclosure, it is necessary to select an appropriate perimeter of the resonator according to the application conditions.

In order to make the objectives, technical solutions, and advantages of the disclosure clearer and more comprehensible, the disclosure is further described in detail with reference to the drawings and embodiments. In order to describe the characteristics of the disclosure in detail, a microring resonator is selected herein as an example analysis of all-optical wavelength conversion based on the four-wave mixing effect in the nonlinear effect. The four-wave mixing effect is a common nonlinear effect and is widely used in all-optical wavelength conversion. Taking this as an example, it can well reflect that in the proposed solution, the improvement of the nonlinear effect intensity in the resonator with a large device bandwidth can be achieved.

Figure 6:
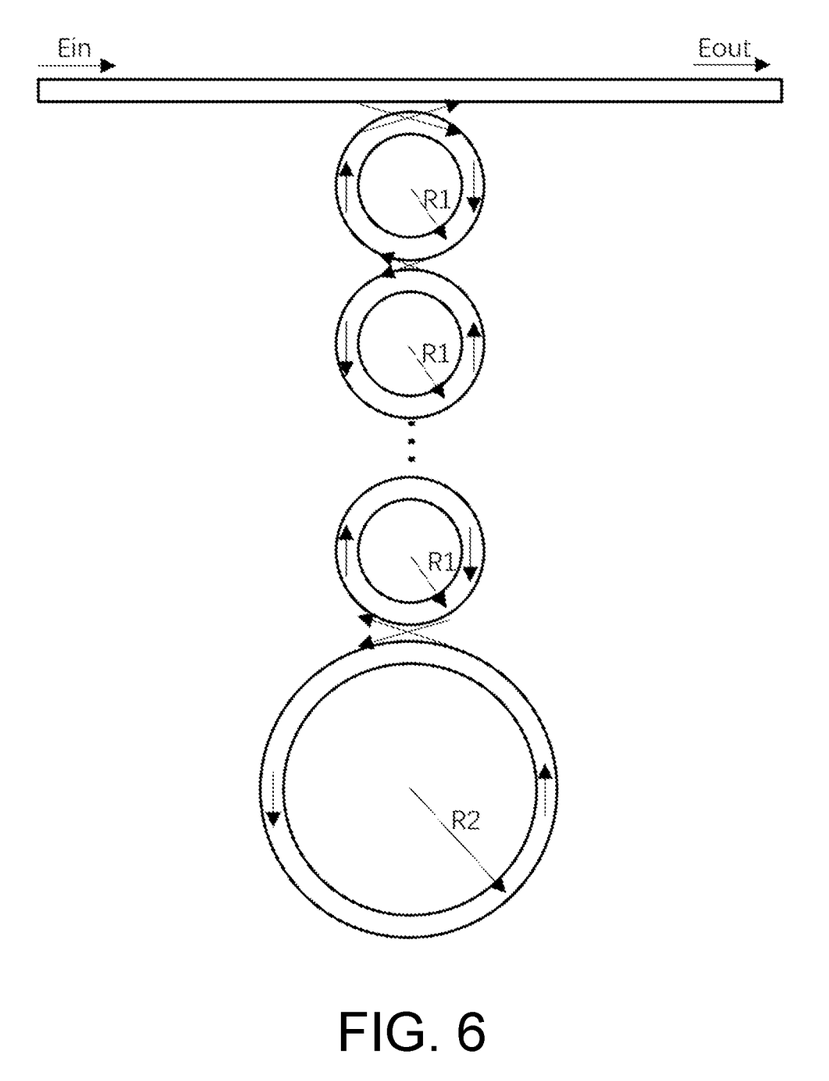
FIG. 6 is a structural schematic diagram of a method for implementing a high-speed and low-power nonlinear device according to the disclosure.

As shown in FIG. 6, the disclosure consists of a first coupling system and a second coupling system. The first coupling system includes a straight waveguide and a plurality of small-sized microring resonators, and the number of resonators is determined by specific application requirements. Generally, the greater the number of resonators, the greater the bandwidth of the device. The second coupling system only includes a large-sized microring resonator. The resonators in the disclosure have no specific form requirements. The free spectral range of the resonator in the first coupling system is an integer multiple of the free spectral range of the resonators in the second coupling system. The coupling coefficient between the resonators is chosen to provide slight mode splitting at the signal frequency. A pumping frequency is as close as possible to a critical coupling condition, a transmission coefficient of a coupled light field between the specific rings is slightly smaller than a ring-pass coefficient of the next-stage microring, and all coupling regions are under an over-coupling condition. The design of using other forms of resonators such as a photonic crystal cavity instead of a microring resonator is also included in the protection scope of the disclosure.

Figure 7:
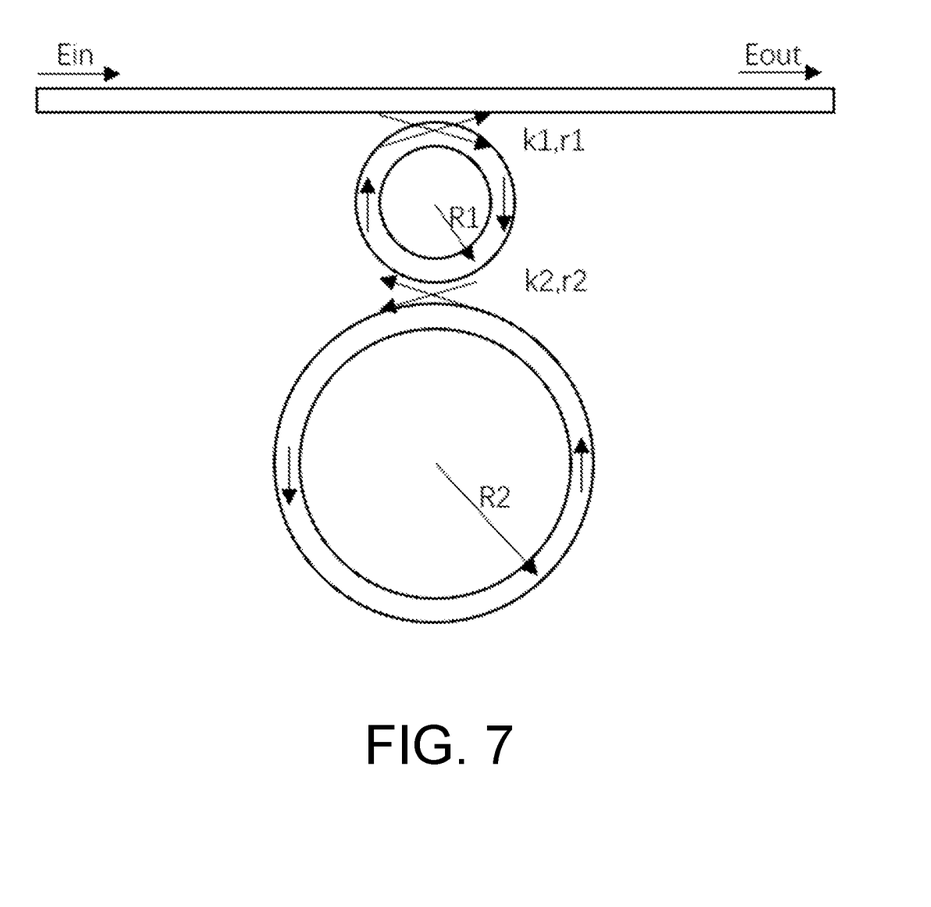
FIG. 7 is a structural schematic diagram of two microring resonators coupled to two waveguides according to an embodiment of the disclosure.

In order to demonstrate the excellent performance of the disclosure more clearly and simply, in a specific embodiment, the number of microring resonators in the first coupling system is selected as 1 (FIG. 7). It should be understood that the specific embodiments described herein serve to explain the disclosure merely and are not used to limit the disclosure.

As shown in FIG. 7, two microring resonators with different sizes and unit loss of 3 dB/cm are used to construct an embodiment of the disclosure. For a microring resonator with a perimeter of L and a material effective refractive index of $n_{eff}$, its m-order resonance wavelength satisfies:

$$\lambda_m = \frac{n_{eff} L}{m}.$$

In the figure, the perimeters of the two rings are denoted as L1 and L2. For microring resonators made of the same material, in order to ensure that the pump light only resonates in the large-sized resonator, the signal light resonates in both the large-sized resonator and the small-sized resonator. The perimeter L2 of the large-sized resonator is an integer multiple of the perimeter L1 of the small-sized resonator.

In the examples provided by the disclosure, a material with $n_{eff}$=3.4764 is selected to prepare two microrings whose perimeters are L1=94.3 μm and L2=188.6 um individually. 1550 nm is only the resonant wavelength of the large-sized microring. Herein, in the microring of the second coupling system, 1550 nm shows a great resonance enhancement, the pump light is selected at this wavelength, and the microring in the second coupling system is in a very high energy state.

For wavelengths satisfying the resonance conditions of both small-sized and large-sized microrings, since the coupling between the first coupling system and the second coupling system undergoes frequency splitting, the resonant peak at this wavelength has a large bandwidth, the signal light at this wavelength can be coupled into the microring of the second coupling system without distortion, and greater resonance enhancement is obtained.

The symbols shown in FIG. 7 are described as follows. The coupling coefficient between the straight waveguide and the small-sized microring is $k_1$, the transmission coefficient is $r_1$, the coupling coefficient between the small-sized microring and the large-sized microring is $k_2$, the transmission coefficient is $r_2$, the ring-pass coefficient of the small-sized resonator is $a_1$, the ring-pass coefficient of the large-sized resonator is a2, and the ring-pass coefficient is determined by a loss coefficient α (including a material loss, a bending loss, a scattering loss, etc.): α=exp (−αL/2).

For the all-optical conversion application based on four-wave mixing demonstrated in this example, the converted light generation efficiency is:

$$\eta = \frac{I_i^{(out)}}{I_s^{(in)}} = |\gamma P L_{eff}|^2 F_p^2 F_s F_i \cdot k_1^2,$$

where P is the power of pump light, γ is the nonlinear coefficient of the material, $L_{eff}$ is the effective length of the microring, and $F_p$, $F_s$, and $F_i$ respectively are the power enhancement factors of the second coupling system for the pump light, the signal light, and the converted light.

For the system demonstrated by the example provided by the disclosure, compared to the single-ring system, in the structure provided by the disclosure, the intensity enhancement of the pump light is significantly improved while the signal bandwidth is ensured, and the significant efficiency improvement is thus obtained.

A group of specific parameters of the embodiments of the disclosure are given in Table 1 below:

TABLE 1

| | | | |
|---|---|---|---|
| Small-sized resonator loss $α_1$ | 3 dB/cm | Large-sized resonator loss $α_2$ | 3 dB/cm |
| Small-sized resonator perimeter L1 | 94.3 um | Large-sized resonator perimeter L2 | 188.6 um |
| Coupling coefficient $k_1$ between straight waveguide and small-sized resonator | 0.7141 | Coupling coefficient $k_2$ between small-sized resonator and large-sized resonator | 0.3737 |
| Small-sized resonator FSR | 915.2 GHz | Large-sized resonator FSR | 457.6 GHz |
| Microring refractive index $n_0$ | 3.4764 | Nonlinear coefficient γ | 720/(Wm) |
| Input pump light power | 30 mW | Signal light bandwidth | 80 GHz |
| All-optical wavelength conversion efficiency of the disclosure | −3.21 dB | All-optical wavelength conversion efficiency of a single ring system | −26.46 dB |

The 1550 nm pump resonates only in the large-sized resonator of the second coupling system, and the input signal light can resonate in both the large-sized resonator and the small-sized resonator. Through the set coupling coefficient between the first coupling system and the second coupling system, the pump light is greatly enhanced in resonance in the second coupling system. Further, at the signal light, resonance peak splitting occurs to widen the resonance peak width of the second coupling system. The signal light can enter the second coupling system without distortion and obtain resonance enhancement therein. Therefore, the nonlinear efficiency is considerably improved under the condition of ensuring the bandwidth of the device.

The number of microrings in the first coupling system of the disclosure is not limited to 1 and can be flexibly increased according to specific application requirements. Generally, the greater the required device bandwidth, the greater the number of microrings required in the first coupling system.

Figure 8:
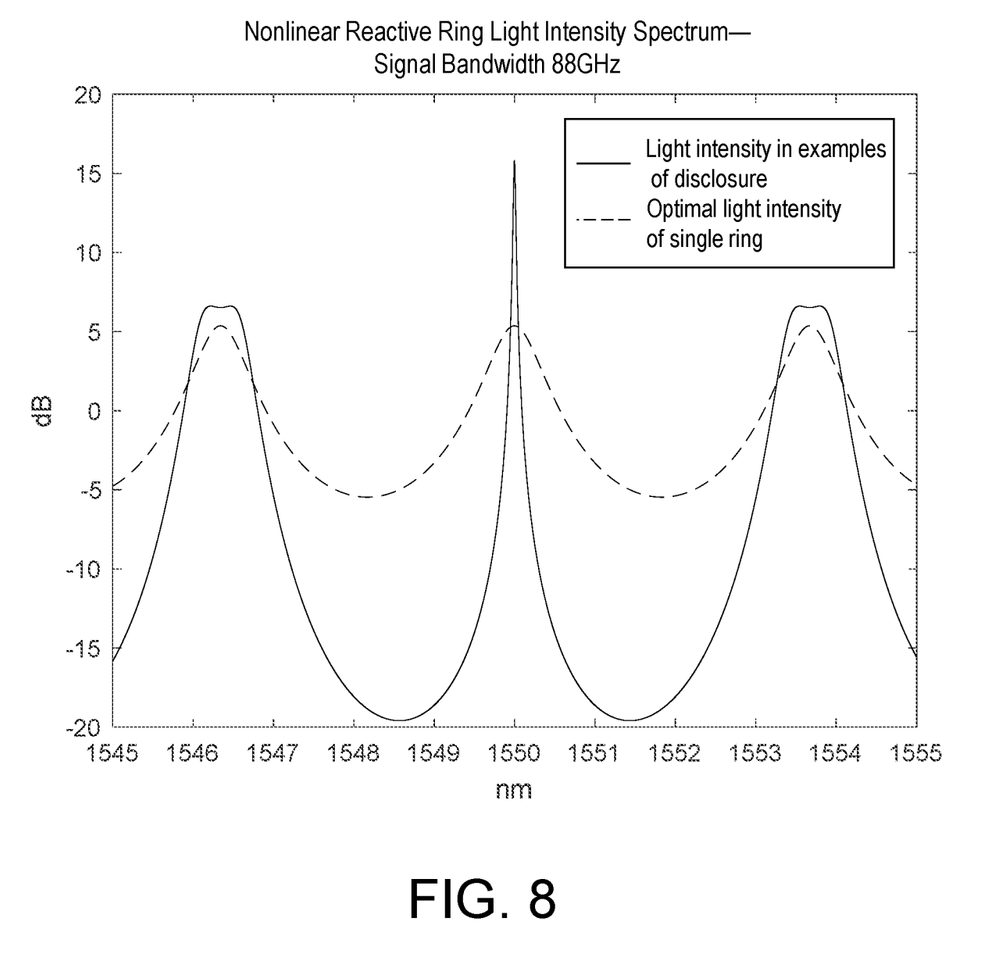
FIG. 8 is a schematic diagram comparing field enhancement spectra of pump light, signal light, and converted light to an optimal field enhancement spectrum of a single microring resonator coupled to a waveguide structure under a same bandwidth of the signal light according to an embodiment of the disclosure.

FIG. 8 is a schematic diagram comparing field enhancement spectra of the pump light, the signal light, and the converted light to an optimal field enhancement spectrum of a single microring resonator coupled to a waveguide structure under the same bandwidth of the signal light according to an embodiment of the disclosure. As shown in FIG. 8, the pump light with a wavelength of 1550 nm can obtain an enhancement of approximately 17 dB (50 times) compared to the input power of the pump light in the second coupling system. For the signal light whose wavelength center is at 1546.3 nm, the signal with a maximum bandwidth of 88 GHz is allowed to enter the system without distortion, and an enhancement of about 7 dB (5 times) compared to the input signal light power may be obtained in the second coupling system. Finally, in the second coupling system, wavelength conversion using four-wave mixing may generate idler light at 1553.7 nm carrying the same information as the signal light. The conversion efficiency of the nonlinear effect may reach −3.21 dB, which is 21.25 dB (approximately 133 times) higher than the −24.46 dB conversion efficiency of the commonly used single microring system at 88 GHz bandwidth.

In the disclosure, microring resonators are used in the description process, but the disclosure does not limit the type of the resonators, and switching to other types of resonators should also fall within the protection scope of the disclosure.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A nonlinear optical device, comprising a first coupling system and a second coupling system, wherein
the first coupling system comprises a straight waveguide and at least one first microring resonator,
the second coupling system comprises only a second microring resonator, a perimeter of the second microring resonator is N times a perimeter of the at least one first microring resonator, N is an integer, and N is greater than 1,
an optical signal transmitted by the straight waveguide is coupled to a first microring resonator in the at least one first microring resonator, when the at least one first microring resonator comprises two or more than two first microring resonators, each of the first microring resonators is only coupled to the optical signal transmitted by the previous first microring resonator, and the coupling is that an optical signal transmitted by a previous component is coupled and transmitted to a next component,
an optical signal transmitted by a last first microring resonator is coupled to the second microring resonator and is outputted after being transmitted by the second microring resonator, and the optical signal comprises pump light and signal light,
parameters of the first coupling system and the second coupling system are controlled so that the optical device is in an over-coupling state close to a critical coupling state, the critical coupling state is that the pump light is not emitted from the other end of the straight waveguide after being incident on one end of the straight waveguide, and all remains in the at least one first microring resonator and the second microring resonator, the second coupling system introduces a π phase shift to the first coupling system at its own resonant frequency when the optical device is in the over-coupling state close to the critical coupling state, and the pump light resonates weakly in the first resonant system and is resonantly enhanced by the second coupling system,
the number of the at least one first microring resonator and the degree of over-coupling of the optical device are controlled so that a bandwidth of the first coupling system is greater than a bandwidth of the incident signal light, and the signal light is prevented from being distorted in the first coupling system, the perimeter of the second microring resonator is N times the perimeter of the at least one first microring resonator, so that the first coupling system and the second coupling system have several same resonant frequencies, the optical device is in the over-coupling state close to critical coupling state at the same resonant frequency, the signal light generates a slight frequency split at a resonant peak of the second coupling system, so that a full width at half maximum of the resonant peak of the second coupling system is widened, and the signal light enters the second coupling system without distortion, and the pump light and the signal light give rise to a nonlinear effect in the second coupling system.

2. The nonlinear optical device according to claim 1, wherein a bandwidth of the resonant peak corresponding to a central wavelength of the signal light in the second coupling system is greater than a bandwidth of a resonant peak corresponding to a central wavelength of the pump light in the second coupling system.

3. The nonlinear optical device according to claim 1, wherein a material of the at least one first microring resonator and a material of the second microring resonator are the same.

4. The nonlinear optical device according to claim 3, wherein a loss of the at least one first microring resonator and a loss of the second microring resonator are both below 5 dB/cm.

5. The nonlinear optical device according to claim 4, wherein the perimeter of the second microring resonator is N times the perimeter of the at least one first microring resonator, so that a free spectral range of the at least one first microring resonator is N times a free spectral range of the second microring resonator, a series of resonant frequencies of the at least one first microring resonator are also resonant frequencies of the second microring resonator, and after the first coupling system and the second coupling system are coupled, splitting of the resonance peak occurs at the same resonance frequency, so that the bandwidth of the resonance peak at the same resonance frequency increases,
since the perimeter of the second microring resonator is N times the perimeter of the at least one first microring resonator, for the second microring resonator, N−1 resonant frequencies are presented between two resonant frequencies of the at least one first microring resonator, N−1 small peaks are generated between the two resonance frequencies of the at least one first microring resonator after the first coupling system and the second coupling system are coupled, the second microring resonator further provides a resonance enhancement effect, and a high resonance enhancement effect is achieved at the resonance frequencies corresponding to these N−1 small peaks.

6. The nonlinear optical device according to claim 1, wherein a loss of the at least one first microring resonator and a loss of the second microring resonator are both below 5 dB/cm.

7. The nonlinear optical device according to claim 1, wherein the perimeter of the second microring resonator is N times the perimeter of the at least one first microring resonator, so that a free spectral range of the at least one first microring resonator is N times a free spectral range of the second microring resonator, a series of resonant frequencies of the at least one first microring resonator are also resonant frequencies of the second microring resonator, and after the first coupling system and the second coupling system are coupled, splitting of the resonance peak occurs at the same resonance frequency, so that the bandwidth of the resonance peak at the same resonance frequency increases, since the perimeter of the second microring resonator is N times the perimeter of the at least one first microring resonator, for the second microring resonator, N−1 resonant frequencies are presented between two resonant frequencies of the at least one first microring resonator, N−1 small peaks are generated between the two resonance frequencies of the at least one first microring resonator after the first coupling system and the second coupling system are coupled, the second microring resonator further provides a resonance enhancement effect, and a high resonance enhancement effect is achieved at the resonance frequencies corresponding to these N−1 small peaks.

* * * * *